US010810596B2

(12) United States Patent
Bryson et al.

(10) Patent No.: US 10,810,596 B2
(45) Date of Patent: Oct. 20, 2020

(54) SYSTEMS AND METHODS FOR MANAGING ACCESS TO SEGMENTS OF PAYMENT NETWORKS

(71) Applicant: MASTERCARD INTERNATIONAL INCORPORATED, Purchase, NY (US)

(72) Inventors: Brandon Bryson, Wildwood, MO (US); David Rook, Eureka, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 725 days.

(21) Appl. No.: 14/676,024

(22) Filed: Apr. 1, 2015

(65) Prior Publication Data

US 2016/0292681 A1   Oct. 6, 2016

(51) Int. Cl.
*G06Q 20/40* (2012.01)
*G06Q 10/06* (2012.01)

(52) U.S. Cl.
CPC ........... *G06Q 20/405* (2013.01); *G06Q 10/06* (2013.01)

(58) Field of Classification Search
None
See application file for complete search history.

(56) References Cited

U.S. PATENT DOCUMENTS

| 7,644,410 | B1* | 1/2010 | Graupner | G06F 9/5011 |
| | | | | 709/223 |
| 2003/0009382 | A1* | 1/2003 | D'Arbeloff | G06Q 20/02 |
| | | | | 705/17 |
| 2006/0156157 | A1* | 7/2006 | Haselden | G06F 11/0793 |
| | | | | 714/746 |
| 2011/0173122 | A1* | 7/2011 | Singhal | G06Q 20/32 |
| | | | | 705/44 |

* cited by examiner

*Primary Examiner* — Jason Borlinghaus
(74) *Attorney, Agent, or Firm* — Harness, Dickey & Pierce, P.L.C.

(57) ABSTRACT

Systems and methods are provided for managing access to segments of payment networks, where the segments are related to transaction data of the payment networks and/or functions associated with the payment networks. In response to a request for access to segments of a payment network, the payment network schedules workflows for each of the segments to satisfy access conditions associated with the segments. For each workflow, an operation is initiated from a sequence of operations to begin satisfying the access conditions. When an operation fails, the workflow is halted. And, after a predetermined event, and prior to initiation of a next operation in the sequence, the failed operation is re-initiated thereby restarting the workflow at the failed operation instead of restarting the entire workflow. The user is then permitted access to the segments when each operation in the sequence is completed.

9 Claims, 4 Drawing Sheets

SYSTEMS AND METHODS FOR MANAGING ACCESS TO SEGMENTS OF PAYMENT NETWORKS

FIELD

The present disclosure generally relates to systems and methods for managing access to segments of payment networks.

BACKGROUND

This section provides background information related to the present disclosure which is not necessarily prior art.

Payment accounts are commonly used, by consumers, to transact for the purchase of a variety of different products from merchants. The transactions are posted to the payment accounts through interactions between, and the cooperation of, various acquirers associated with the merchants and various issuers associated with the payment accounts. Generally, actions related to the interactions pass through one or more payment networks. In connection therewith, different entities gather data related to the transactions. In addition, the payment networks are known to offer services to the acquirers and/or the issuers to assist in processing, reporting and/or reviewing the transactions.

DRAWINGS

The drawings described herein are for illustrative purposes only of selected embodiments and not all possible implementations, and are not intended to limit the scope of the present disclosure.

Figure 1:
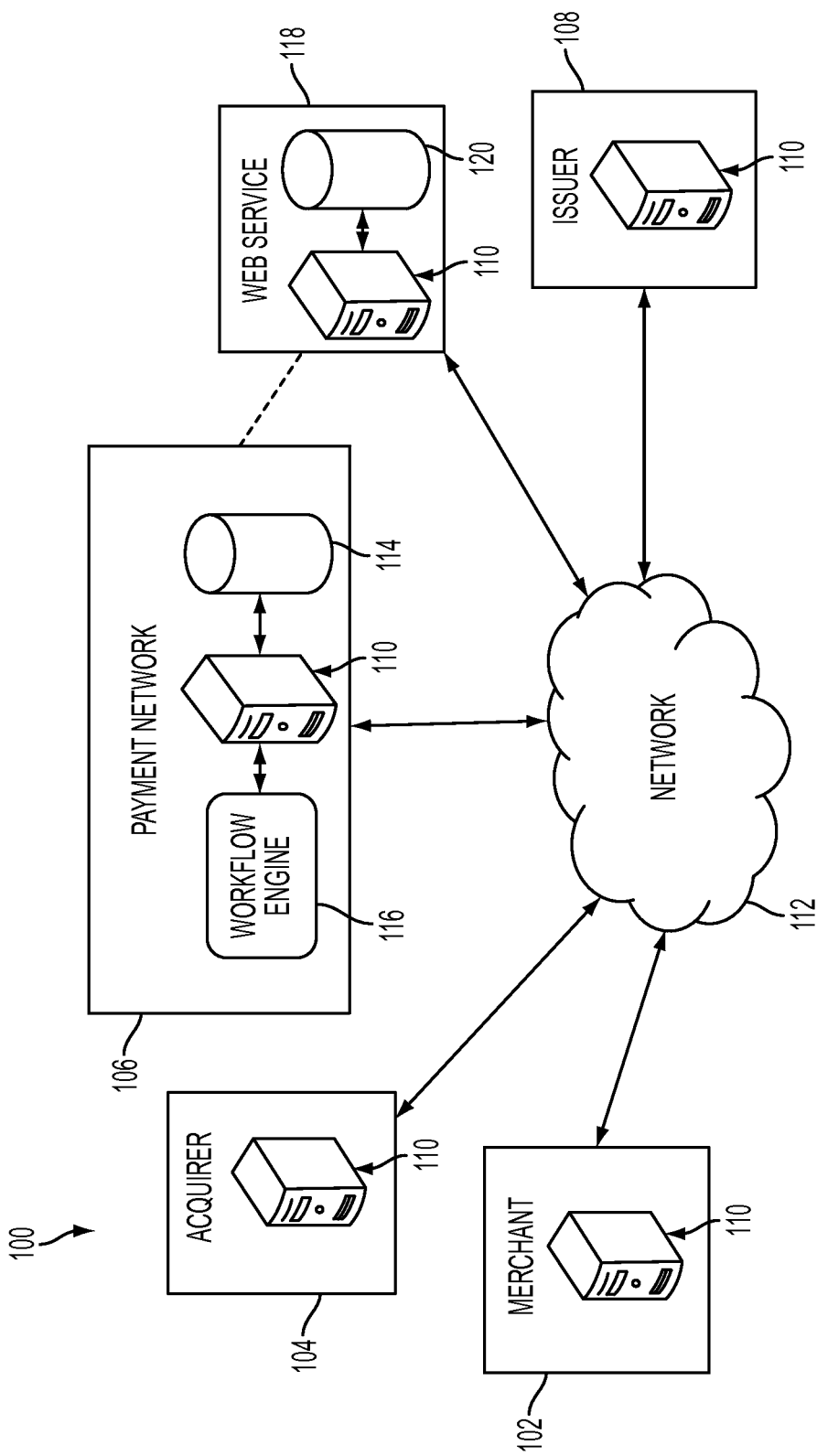
FIG. 1 shows an exemplary system that can be used to manage access to segments of a payment network in response to an order, from a user, requesting such access.
Figure 3:
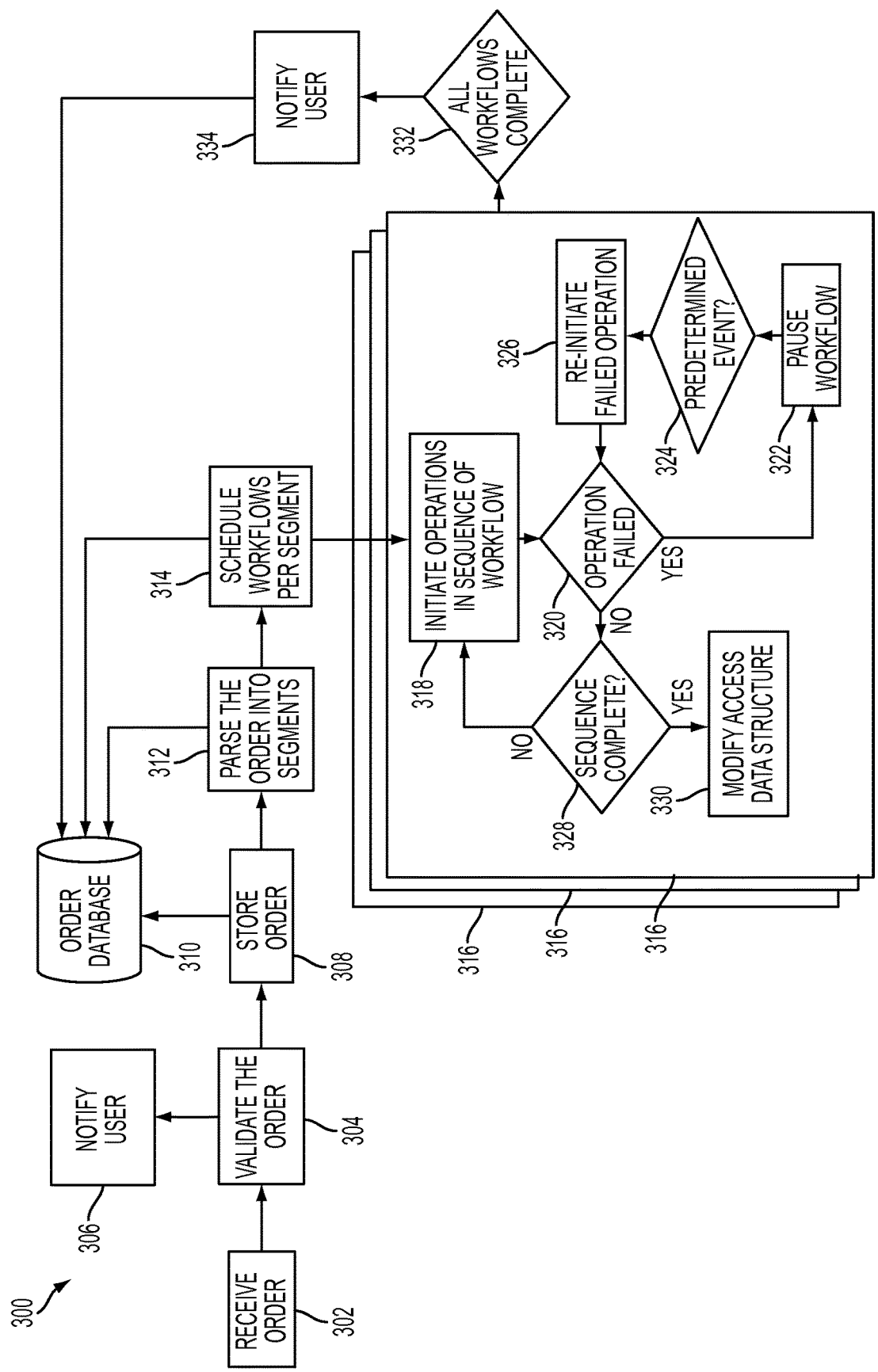
Figure 4:
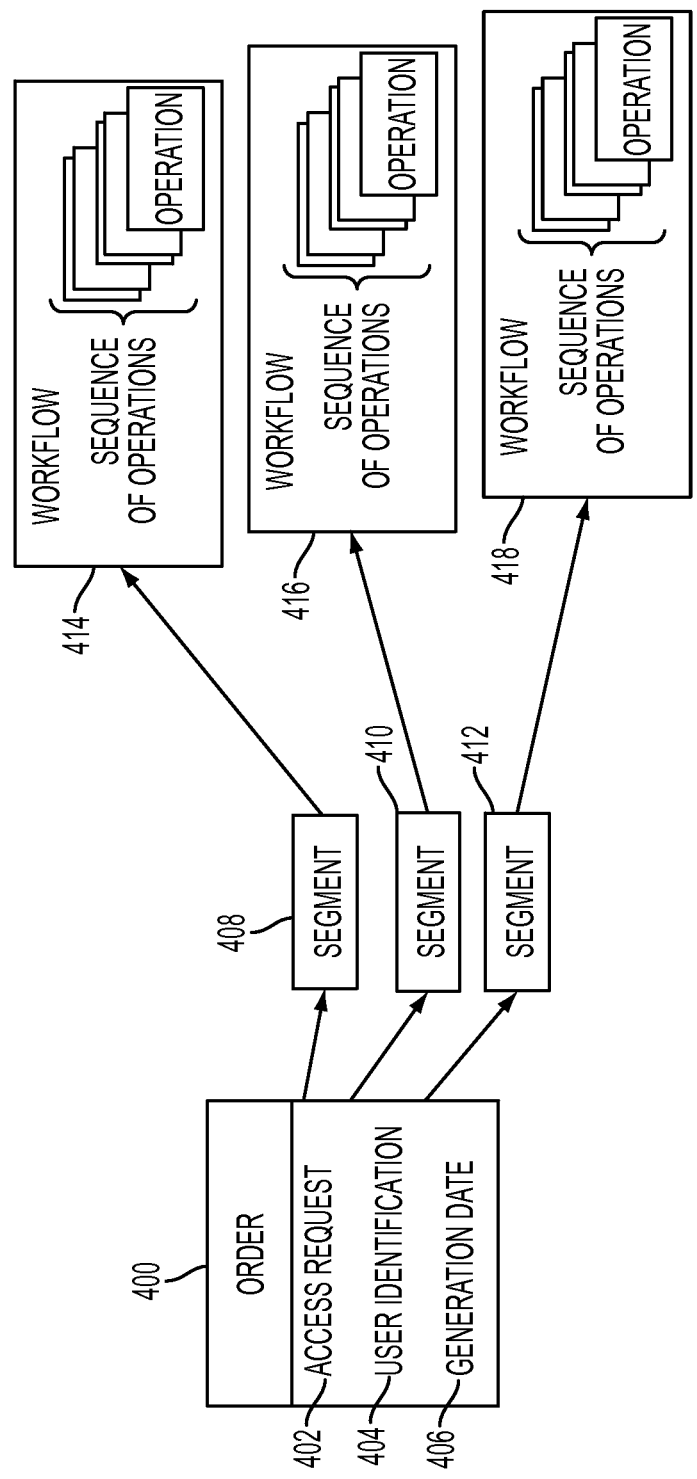

FIG. 3 is a block diagram of an exemplary method for managing access to segments of a payment network, which may be implemented in the exemplary system of FIG. 1; and FIG. 4 is a block diagram of an example order that may be submitted to a payment network in connection with a request to access segments of the payment network, and related workflows, suitable for use in the system of FIG. 1 and/or the method of FIG. 3.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment accounts are used by consumers in transactions for goods and services from merchants. The transactions are authorized, cleared and settled through cooperation among and between the merchants, acquirers associated with the merchants, payment networks, and issuers of the payment accounts. For one or more reasons, the issuers and acquirers may request access to segments of the payment network, such as, for example, transaction data stored in the payment network, or tools or applications (broadly, functions) associated with the payment network for processing the transaction data and/or providing reports relating thereto. In response, the payment network generates workflows to achieve the requested access. Typically, when such workflows are halted, due to any number of reasons (e.g., failed steps (broadly, herein operations), etc.), the entire workflows fail, and are left in inconsistent states. The systems and methods herein, in contrast, monitor sequences of operations making up the workflows and, for each of the workflows, if any operation fails, restart the failed operation rather than the entire workflow. In particular, in several embodiments of the systems and methods herein, for each workflow, any failed operation is re-initiated after a predetermined event, to facilitate timely completion of the failed operation, and the workflow, without repeating completed operations of the workflow or restarting the entire workflow, and to thereby efficiently grant the desired access to the requestor (e.g., the acquirer, the issuer, others, etc.).

FIG. 1 illustrates an exemplary system 100, in which the one or more aspects of the present disclosure may be implemented. The system 100 can be used to manage access to payment network segments, for example, in response to orders, or other requests, for access from users. Although components of the system 100 are presented in one arrangement, other embodiments may include the same or different components arranged otherwise, depending, for example, on manners of processing access requests, manners of processing payment transactions, locations of payment network segments, locations of transaction data, access conditions for payment network segments, etc.

The illustrated system 100 generally includes a merchant 102, an acquirer 104, a payment network 106, and an issuer 108. The acquirer 104 is generally associated with the merchant 102 and helps facilitate authorization and settlement of payment transactions involving the merchant 102, as will be described. The issuer 108 provides payment accounts and corresponding payment devices to consumers for use in the payment transactions with the merchant 102, as will also be described.

The merchant 102, the acquirer 104, the payment network 106, and the issuer 108 each include a computing device 110, coupled to network 112. The network 112 of the illustrated system 100 may include, without limitation, one or more local area networks (LAN), wide area networks (WAN) (e.g., the Internet, etc.), mobile networks, virtual networks, other networks as described herein, and/or other suitable public and/or private networks capable of supporting communication among two or more of the illustrated components, or even combinations thereof. In one example, the network 112 includes multiple networks, where different ones of the multiple networks are accessible to different ones of the illustrated components in FIG. 1. The computing devices 110 may include a single computing device, or multiple computing devices located together and/or distributed across a geographic region. Each computing device 110 may include, without limitation, a server, a laptop computer, a workstation computer, a tablet computer, a smart phone, or other communication device, the like, or combinations thereof.

Although only one merchant 102, one acquirer 104, and one issuer 108 are illustrated in the system 100 of FIG. 1, it should be appreciated that, in other embodiments, systems may include multiple ones of each of these entities.

In the system 100, a consumer initiates a transaction at the merchant 102 for a desired product (e.g., a good or service, etc.) by presenting a payment device to the merchant 102. The payment device is associated with a payment account, issued by the issuer 108 to the consumer, and may include any suitable device such as, for example, a payment card (e.g., a credit card, a debit card, etc.), a payment token, a payment tag, a pass, another enabled device used to provide an account number (e.g., a mobile phone, a tablet, etc.), etc. In response, the merchant 102, the acquirer 104, the payment network 106, and the issuer 108 cooperate to authorize and clear the transaction. In particular, the merchant 102 (via the acquirer 104) communicates with the issuer 108, through the payment network 106 (e.g., using the MasterCard® interchange, etc.), for authorization for the transaction. If the issuer 108 accepts the transaction, an authorization response is provided back through the payment network 106 (and the acquirer 104) to the merchant 102. Upon authorization, the transaction generally is completed. The credit of the payment account used by the consumer in the transaction is altered by the amount of the transaction, and the transaction is posted to the consumer's payment account. The transaction is later settled and cleared by and between the acquirer 104 and the issuer 108, directly or via the payment network 106.

While, in the above example, the transaction is described with reference to a particular routing of data through the system 100, it should be appreciated that the merchant 102, the acquirer 104, the payment network 106 and the issuer 108 may perform one or more functions differently, and may communicate directly or indirectly with each other or with other entities, in order to authorize and/or clear the transaction (or one or more other transactions).

When the transaction is completed in system 100, transaction data is generated as part of the interactions among the consumer, the merchant 102, the acquirer 104, the payment network 106, and the issuer 108. The transaction data includes various details of the transaction such as, without limitation, a payment account number (PAN) for the consumer's payment account, an amount of the transaction, a time/date of the transaction, a merchant identification number (MID) for the merchant 102, a merchant category code (MCC) for the merchant 102, a name or other identifier of the consumer, etc.

The transaction data associated with the transaction may be stored within the system 100 at one or more different ones of the entities participating in the interactions. In the illustrated embodiment, for example, the transaction data is stored in a data structure 114 of the payment network 106. The data structure 114 may be located in a single location, or distributed geographically over a number of locations. In addition, the data structure 114 may be wholly, or partially, incorporated in computing device 110 of the payment network 106.

With continued reference to FIG. 1, the payment network 106 of the system 100 may be viewed as comprising multiple different segments. The segments may include groupings of transaction data, stored in the data structure 114, for various transactions processed through the payment network 106. The segments may also include various tools or applications (broadly, functions) associated with the payment network 106 and configured, for example, to process the transaction data stored in the data structure 114, to manage interactions between users (e.g., the acquirer 104, the issuer 108, etc.) and the payment network 106, etc. In various aspects, the segments may also include combinations of various transaction data and applications, for example, for processing the transaction data, for generating desired reports relating to the transaction data, etc.

In the illustrated system, the transaction data stored in the data structure 114 of the payment network 106 is assigned to one of the multiple different segments of the payment network 106 (e.g., within the data structure 114, etc.). The assigned segments may be based on the merchant 102, the acquirer 104, the issuer 108, the consumer (not shown), etc. In multiple embodiments, the transaction data associated with the transaction, in the above example, is segmented, or assigned to a segment, based on the PAN associated with the transaction, based on a bank identification number (BIN) associated with the transaction, based on an interbank card association (ICA) related to the transaction, or based on combinations thereof. In addition to the corresponding transaction data, some of the segments further include one or more applications configured to process the transaction data (e.g., perform a variety of functions related to the payment network 106 and/or the transaction data stored therein, etc.). Further, some of the segments include only applications (e.g., perform a variety of functions related to the payment network 106 and/or the transaction data stored therein, etc.), without any transaction data.

As an example, one segment may include transaction data associated with various transactions to payment accounts issued by the issuer 108 and another segment may include an application for fraud detection, both of which can be accessed by the issuer 108, or another entity, to evaluate a particular one or more of the transactions for possible fraud (e.g., one of the transactions to a particular payment account, a group of transactions to multiple payment accounts, etc.). In another example, one segment may include both the transaction data associated with the various transactions to the payment accounts issued by the issuer 108 and the application for fraud detection. In other examples, segments may include dispute resolution applications; bill pay applications; analytic applications related to the merchant 102, the acquirer 104, the issuer 106, etc.; processing applications for use by the merchant 102, the acquirer 104, the issuer 106, etc. for use in processing transactions via the payment network 106; etc. (alone, or in combination with transaction data). Further examples are provided in the following descriptions. With that said, it should be appreciated that a number of other different applications and/or features may be included in or as segments of the payment network 106, to which other entities (e.g., the merchant 102, the acquirer 104, the issuer 106, other entities, etc.) may request access.

Each of the segments of the payment network 106 includes at least one condition for access to the segment. The access condition(s) for each of the segments are generally indicative of types of transaction data associated with the segment, or of types of rights required to implement an application associated with the segment. For example, if a segment includes transaction data and/or an application with "view only" access for the issuer 106, an access condition may be an access approval by a particular person (e.g., an administrator or gatekeeper of the transaction data or application in the segment, etc.). Conversely, if a segment includes transaction data and/or an application with "edit rights" access for the issuer 106, one access condition may be an access approval by a particular person (e.g., an administrator or gatekeeper of the transaction data or application in the segment, etc.) and another access condition may then be an edit approval by another person. With that said, access conditions may include, without limitation, permissions from administrators or other gatekeepers of transaction data (on one or more different levels), permissions from administrators or other gatekeepers of applications for processing transaction data (on one or more different levels), permissions from administrators or other gatekeepers of applications for processing transactions via the payment network 106 (on one or more different levels), permissions from administrators or other gatekeepers of applications for modifying interactions between various entities of the system 100 and the payment network 106 (on one or more different levels), etc.

Further, the various one or more access conditions associated with the segments of the payment network 106 are themselves stored, in the exemplary system 100, in an access data structure that is part of the data structure 114. In other embodiments, however, the access conditions may be stored differently, for example, directly in the data structure 114, in memory of the computing device 110, or otherwise.

Separately in the system 100, a user (e.g., the acquirer 104, the issuer 108, or even the merchant 102, etc.) may generate an order requesting access to one or more segments of the payment network 106. This may include a request to access various transaction data stored in the data structure 114 of the payment network 106, use of an application supported by the payment network 106 and related to various transaction data stored in the data structure 114, and/or use of an applications supported by the payment network 106 and related to conditions of use, by the user, for the payment network 106.

As an example, a fraud investigator employed by the issuer 108 may request access to transaction data, from the payment service 106, for a particular BIN for use in generating a fraud report for some or all of the transaction data associated with the particular BIN. In this example, the order/request may involve two segments of the payment network 106, one associated with the transaction data for the particular BIN and one associated with a fraud application for processing the transaction data and generating the fraud report. As another example, the acquirer 104 may request a report from the payment service 106 (i.e., access to particular transaction data and a desired application for processing the transaction data) summarizing various clearing transactions associated with multiple BINs, for example, via a bill pay application provided by the payment service 106, etc. Here, the order/request may involve one segment of the payment network 106 associated with the particular transaction data (or multiple segments of the payment network 106, depending on the amount of transaction data requested and how the requested transaction data is stored in the data structure 114, etc.), and one segment of the payment network 106 associated with the bill pay application. In still another example, the acquirer 104 or issuer 108 may request access to an application permitting them to alter conditions of interactions with the payment network 106 such as, for example, how/when the issuer 108 is billed by the payment network 106, and/or how the issuer's payment accounts are routed, handled, or charged by the payment network 106, etc. In this example, the order/request may involve one segment of the payment network 106, involving the particular application related to the desired condition to be altered.

In any case, the order requesting access to the segments of the payment network 106 may be initiated by the user, via one or more interfaces provided by the payment service 106 (e.g., provided by the computing device 110 of the payment service 106, etc.), and displayed to the user at a computing device associated with the user. Once completed by the user and transmitted, the order is received by the payment service 106, via the network 112, and stored in an order data structure (e.g., order data structure 310 in FIG. 3, etc.) of the payment network 106. Like the access data structure, the order data structure is part of data structure 114 in the illustrated system 100, but may be separate therefrom in other embodiments.

Further in the illustrated system 100, the payment service 106 includes a workflow engine 116 configured, often by computer-readable instructions, to receive the order and manage (e.g., provision, etc.) access to the desired segments of the payment network 106 identified in the order, through workflows associated with the segments. The workflow engine 116 may be incorporated into the computing device 110 of the payment service 106, or may be a separate computing device located together and/or distributed apart from the computing device 110. In addition, in other embodiments, the workflow engine 116 may be incorporated at other entities of the system 100, or even in entities not shown in the system but which still interact with system 100.

In connection with receiving the order requesting access to the segments of the payment network 106, the workflow engine 116 initially validates the order, identifies the segment(s) of the payment network 106 to which the order is directed, and generates/schedules workflows to provide access to the segment(s) (e.g., in the access data structure, etc.). In the illustrated embodiment, a workflow (e.g., one or more steps (again, broadly herein operations), etc.) is scheduled for each segment (broadly, each aspect) identified in the order, and is directed at least partially to satisfying/achieving the particular access condition(s) associated with each identified segment. Once a workflow is scheduled, the workflow engine 116 causes the workflow to be executed by one or more processors (e.g., one or more processors associated with the payment network's computing device 110, etc.).

The workflows, in system 100, each include a sequence of one or more operations to be completed, in a particular order, to achieve access, for the user, to the desired segment(s) of the payment network 106 identified in, or required by, the order. In particular, the operations (and their given order), when completed, generally operate to satisfy the various access conditions associated with the desired segment(s) of the payment network 106, from the order. The operations may include acquiring permissions from appropriate personnel to access transaction data, to process transaction data, to access applications, to modify relations with the payment network 106, etc. In connection therewith, the workflow engine 116 generally performs the workflows by causing the sequence of one or more operations to be initiated. Then, when the one or more operations are completed, the workflow is completed, and the workflow engine 116 modifies the access data structure to grant the user the appropriate access to the associated segment(s).

In some embodiments, the workflows generated/scheduled by the workflow engine 116 of the payment network 106 may include predefined operations stored in the data structure 114 (e.g., in the access data structure of the data structure 114, etc.). In these embodiments, upon execution of the workflows, each of the predefined operations is then assessed, by the workflow engine 116, for applicability based on the orders and, if not needed in connection with completing the particular workflows (and the associated orders), possibly skipped. In other embodiments, the workflows generated/scheduled by the workflow engine 116 may additionally (or alternatively) include one or more unique operations provided by the workflow engine 116 based on the particular segment(s) from the order submitted by the user. For example, in some of these embodiments, the workflow engine 116 may identify a compilation of unique operations to be included in the workflows, based on the particular segment(s) from the order, such that the workflow engine 116 essentially builds the workflows as needed to satisfy the order, etc.

Uniquely in the system 100, if any one of the operations of a workflow fails (e.g., acquiring permission from an administrator to access certain transaction data, etc.), the workflow engine 116 designates the operation as failed and halts the workflow. After a predetermined event, and prior to initiating a subsequent operation of the workflow, the workflow engine 116 re-initiates the failed operation to thereby restart the workflow at the place the failure occurred (instead of restarting the entire workflow, and instead of redoing any operations that have already been completed). In this particular embodiment, the failed operation is repeated or re-initiated, as many times as necessary, until it is completed. This is done in connection with each failed operation in the workflow, and for all workflows scheduled by the workflow engine 116 to provide access to the segment(s) identified from order. In addition, in various embodiments, the workflow engine 116 waits for the operation to complete, before initiating any subsequent operations (although this is not required, for example, where the subsequent operations could be completed by the workflow engine 116 in parallel to prior operation, etc.). Then, when the workflow is completed (even when a failed operation occurred), the workflow engine 116 modifies the access data structure to grant the user the appropriate access to the associated segment(s).

The illustrated system 100 also includes a web service 118, which may be part of the payment network 106, as indicated by the broken lines in FIG. 1, or separate therefrom (e.g., an external dependency or set of dependencies, etc.). The web service 118 includes a computing device 110, and a data structure 120. In one or more embodiments, the workflow engine 116 calls the web service 118, via the network 112, to help manage access to the segments of the payment network 106, to complete one or more operations of a workflow, and/or to help parse orders into one or more segments. For example, in some embodiments, the access data structure may only be accessible to the workflow engine 116, via the web service 118, etc. As another example, the data structure 120 of the web service 118 may contain various data described herein such as, for example, identities of administrators of various transaction data, identifies of administrators of various applications, etc. As still another example, the web service 118 may host third-party data structures containing various data described herein (e.g., identities of administrators of various transaction data, applications, etc.). In addition, in some embodiments, the web service 118 may even include one or more segments of the payment network 106, whether including transaction data or one or more applications, to which the workflow engine 116 is provisioning access.

Figure 2:
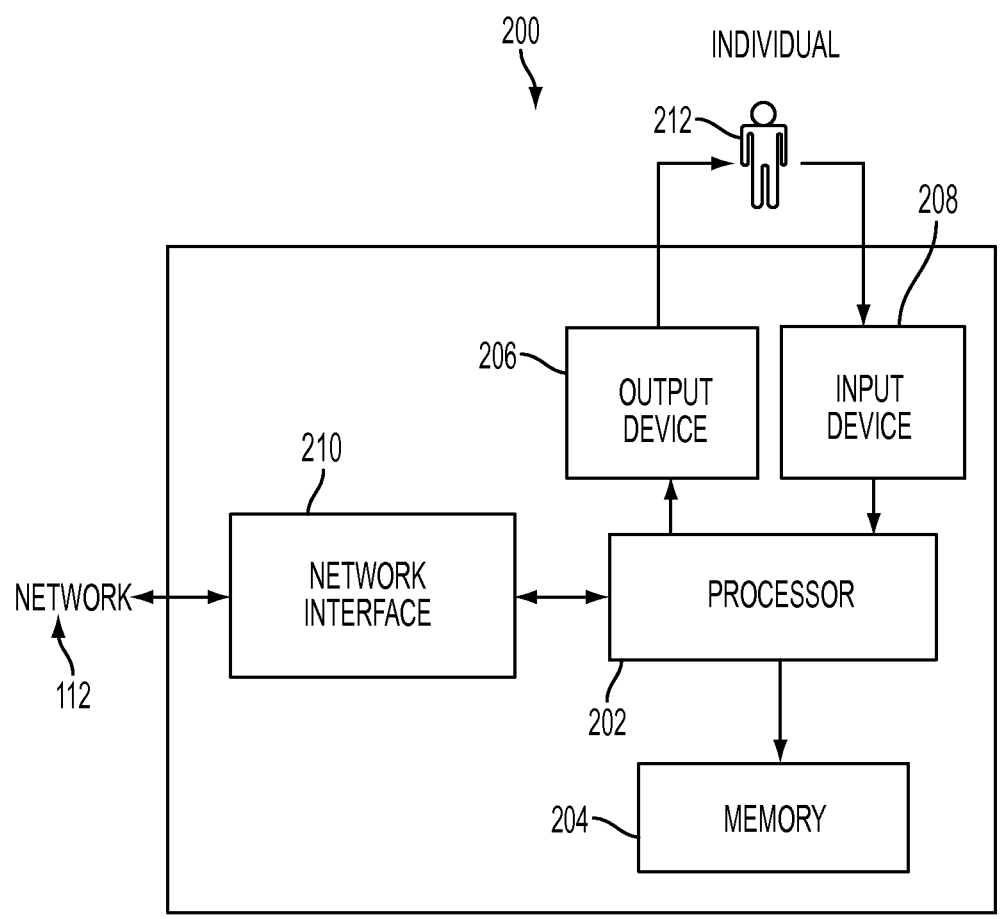
FIG. 2 is a block diagram of an exemplary computing device, suitable for use in the exemplary system of FIG. 1.

FIG. 2 illustrates an exemplary computing device 200. For purposes of the description herein, each computing device 110 shown in FIG. 1 is a computing device, consistent with computing device 200. It should be appreciated that each computing device 110 of FIG. 1 should not be understood to be limited to the arrangement of the computing device 200, as depicted in FIG. 2. Different components and/or arrangements of components may be used in other computing devices. In various embodiments, the computing device 200 includes multiple computing devices located in close proximity, or distributed over a geographic region.

The illustrated computing device 200 includes a processor 202 and a memory 204 that is coupled to the processor 202. The processor 202 may include multiple processors, or multiple threads, i.e., multi-threaded processors, which permit processing of more than one process or operation at one time (e.g., in connection with processing workflows, etc.). The computing device 200 is programmable to perform one or more operations described herein by programming the processor 202 and/or the memory 204. The processor 202 may include, but is not limited to, a general purpose central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein. The above examples are exemplary only, and thus are not intended to limit in any way the definition and/or meaning of processor.

The memory 204, as described herein, is one or more devices that enable information, such as executable instructions and/or other data, to be stored and retrieved. The memory 204 may be configured to store, without limitation, transaction data relating to transactions, transaction segments into which the transaction data is divided, other segments of the payment network 106, access conditions associated with segments of the payment network 106, personnel associated with providing access to segments (or aspects thereof) of the payment network 106, and/or other types of data suitable for use as described herein, etc. In addition, the memory 204 may include one or more computer-readable media, such as, without limitation, dynamic random access memory (DRAM), static random access memory (SRAM), read only memory (ROM), erasable programmable read only memory (EPROM), solid state devices, flash drives, CD-ROMs, thumb drives, tapes, flash drives, hard disks, and/or any other type of volatile or nonvolatile physical or tangible computer-readable media. Further, computer-readable media may, in some embodiments, be selectively insertable to and/or removable from the computing device 200 to permit access to and/or execution by the processor 202 (although this is not required).

In various embodiments, computer-executable instructions may be stored in the memory 204 for execution by the processor 202 to cause the processor 202 to perform one or more of the functions described herein, such that the memory 204 is a physical, tangible, and non-transitory computer-readable media. It should be appreciated that the memory 204 may include a variety of different memories, each implemented in one or more of the functions or processes described herein.

The computing device 200 also includes an output device 206 and an input device 208 coupled to the processor 202.

The output device 206 outputs information and/or data (e.g., transaction data, applications of transaction data, workflows, or any other type of data, etc.) to an individual 212 by, for example, displaying and/or otherwise outputting the information and/or data. In some embodiments, the output device 206 may comprise a display device such that various interfaces (e.g., webpages, etc.) may be displayed at computing device 200, and in particular at the display device, to display such information and/or data, etc. And in some examples, the computing device 200 may also (or alternatively) cause the interfaces to be displayed at a display device of another computing device, including, for example, a server hosting a website having multiple webpages, etc. With that said, the output device 206 may include, without limitation, a cathode ray tube (CRT), a liquid crystal display (LCD), a light-emitting diode (LED) display, an organic LED (OLED) display, an "electronic ink" display, speakers, combinations thereof, etc. In addition, the output device 206 may include multiple devices.

The input device 208 is configured to receive input from the individual 212. For example, the input device 208 may be configured to receive any desired type of input from the individual, for example, as part of evaluating transaction data, processing orders from users, processing workflows, etc. In the exemplary embodiment, the input device 208 may include, without limitation, a keyboard, a pointing device, a mouse, a stylus, a touch sensitive panel (e.g., a touch pad or a touch screen, etc.), another input device. Further, in some exemplary embodiments, a touch screen, such as that included in a tablet, a smartphone, or similar device, may function as both the output device 206 and the input device 208.

With continued reference to FIG. 2, the computing device 200 also includes a network interface 210 coupled to the processor 202. The network interface 210 may include, without limitation, a wired network adapter, a wireless network adapter, a mobile telecommunications adapter, or other device capable of communicating to one or more different networks, including the network 112. In some exemplary embodiments, the computing device 200 includes the processor 202 and one or more network interfaces incorporated into or with the processor 202.

FIG. 3 illustrates an exemplary method 300 of managing access to payment network segments, for example, in response to orders, or other requests, for access to the segments from users that interact with the payment network 106, etc. As described, the segments may include transaction data for various transactions processed through the payment network 106, various tools or applications (broadly, functions) associated with the payment network 106 (e.g., for processing the transaction data, for modifying/controlling interactions between various entities and the payment network 106, etc.), or combinations thereof.

The method 300 can be implemented in connection with the system 100 of FIG. 1 and is described herein as implemented in the payment network 106 of the system 100 (e.g., in the computing device 110 of the payment service 106, in the workflow engine 116, in combinations thereof, etc.), with further reference to the merchant 102, the acquirer 104, and the issuer 108. In addition, for purposes of illustration, the exemplary method 300 is described herein with reference to the computing device 200. However, the various methods herein should not be understood to be limited to the illustrated system 100, or the illustrated computing device 200. Similarly, the various systems and computing devices herein should not be understood to be limited to the illustrated method 300.

The method 300 is also described with reference to example order 400 illustrated in FIG. 4. The order 400 is directed to a request to access transaction data stored in the data structure 114 of the payment network 106 and, for example, associated with one or more desired BINs, such as BIN 123456, BIN 123457, and BIN 123458. As will be described, each of BIN 123456, BIN 123457, and BIN 123458 represents a different segment of the payment network 106 (e.g., segments 408-412 in FIG. 4, etc.), and each includes various access conditions that must be satisfied in order to allow access to the particular segment (and, thus, fulfill/complete the order 400). It should be appreciated that an order may be directed to any number of segments of the payment network 106, including segments containing transaction data stored in the payment network 106, segments containing applications associated with the payment network 106, or combinations thereof.

As shown in FIG. 3, method 300 includes receiving at 302, by the workflow engine 116 and from a user, an order directed to the payment network 106. The order, in this example, is received from the issuer 106. In other examples, different users, which may include a variety of different entities (e.g., those illustrated in FIG. 1, others, etc.), may submit one or more orders to the payment network 106. Often, the user submitting the order is an employee or manager of an entity (e.g., of the issuer 108 in the illustrated method 300, of other entities in other examples, etc.). The particular user, or entity, is often identified in the order, along with the particular transaction data and/or applications requested. A variety of information may be included in the order including, for example, an identification of the user submitting the order, an identification of the entity with whom the user is associated or on whose behalf the user is submitting the order (e.g., when the order includes an "on-behalf orders," etc.) and the user is different from the entity actually at interest in the order, a date of the order, the segments of the payment network 106 to which access is desired (e.g., the functions being requested; the data within the functions being requested and, sometimes, additional function attributes to accompany the request; etc.), other information, combinations thereof, etc. For example, the order 400 shown in FIG. 4 includes a description 402 of the access desired by the user, an indication 404 of the user submitting the order and a date 406 the order was generated.

Upon receiving the order, the workflow engine 116 validates the order at 304. The validation may include, for example, confirming that the order is in an acceptable format for processing, confirming that all required/necessary fields of the order are present (and that all necessary data has been provided by the issuer 106 in order to complete/process the order), confirming that any necessary access credentials provided by the issuer 106 are valid, etc. For example, in the illustrated method 300, the workflow engine 116 may review the order to determine if the particular person submitting the order is actually associated with the issuer 106 (e.g., is an employee, manager, etc. of the issuer 106) and what, if any, access is available to the person (e.g., a base level access, a management level access, full access, etc.). If the order cannot be validated (e.g., if any of the above information cannot be confirmed or appears incorrect, etc.), it is designated as "invalid" by the workflow engine 116 and the user is notified at 306 of the invalid order. Alternatively, if the order is validated at 304, the workflow engine 116 may then instead confirm receipt of the order at 306 to the user.

Additional validation of the order (including additional confirmation of the user submitting the order, etc.) may be used, in some embodiments, depending on rules related to the user, various aspects of the payment network 106, and/or other criteria included or not included in the order. For example, when an order is received for access to a segment of the payment network 106 comprising an application, which functions at the ICA level, and the desired output to the user is a report at the BIN level (based on certain transaction data processed by the application), the order may be designated invalid at 304, and the user then notified of the invalid order at 306, because the requested application and the requested output are not at the same level (i.e., are not compatible, etc.).

In any case, once the order is validated, the workflow engine 116 stores the order at 308 in the order data structure 310 of the payment network 106. Here, the order is continually or periodically stored and/or updated to the data structure 310, as desired, i.e., the data structure 310 includes persistent storage, whereby the status of the order, and the status of any processes associated with the order (e.g., progress of the workflows and/or the sequence of operations associated with the workflows, etc.), can be monitored and/or retrieved despite any interruption to the workflow engine 116 or payment network 106 (e.g., power failures, etc.). At 312, the order is then parsed, by the workflow engine 116, into segments, and the parsed order is updated in the order data structure 310.

As an example, the order 400 in FIG. 4 can be parsed by the workflow engine 116 into the segments 408-412. Each of the segments 408-412 corresponds to transaction data stored in the data structure 114 of the payment network 106 and associated with the requested one or more BINs, and specifically with one of BIN 123456, BIN 123457, and BIN 123458 in this exemplary order 400. For example, a first segment 408 may include the transaction data associated with BIN 123456, a second segment 410 may include the transaction data associated with BIN 123457, and a third segment 412 may include the transaction data associated with BIN 123458. In particular, the workflow engine 116 interrogates the access data structure of the payment network 106, in the data structure 114, to determine how access to the transaction data associated with the requested one or more BINs is controlled. Based on this interrogation, the workflow engine 116 identifies BIN 123456, BIN 123457, and BIN 123458 and parses them into the segments 408-412.

Referring again to FIG. 3, next, the workflow engine 116 schedules, at 314, workflows 316 to be completed to provide the desired access to the segments of the payment network 106 requested by the issuer 108 in the order (and the order is again, at this time, updated in the order data structure 310). As previously described, the workflows 316 generally include operations (e.g., sequences of operations, etc.) assigned thereto to satisfy various access conditions associated with the identified segments of the payment network 106. In the illustrated method 300, the workflow engine 116 schedules the workflows 316 to different processors (or threads thereof), so that at least some of the workflows 316 (and their various operations) are initiated in parallel, or substantially in parallel (although, this is not required). This is indicated in FIG. 3 by the three example layers of workflows 316, with it appreciated that more or fewer layers of workflows 316 may be provided. In method 300, for each of the layered workflows 316, the operations of the workflows 316 are initiated and, in various aspects also performed, in parallel with each other. In other embodiments, multiple workflows may be scheduled to a single processor, or thread to the processor, whereby the workflows are initiated in series. In addition, in some embodiments, multiple workflows are scheduled in series and in parallel, depending on the available processors, and/or threads to the processors.

The number and/or types of operations in each of the workflows 316 may vary depending on the particular segment, and its content, to which the workflow 316 is related. For example, ten operations may be required to permit access to one of the segments 316, while only six operations may be required to permit access to another one of the segments 316. Similarly, different operations (in both number and/or type) may be required for one of the segments 316 that requires "viewing" rights for access, verses another one of the segments 316 that requires "editing" rights for access (however, it should be appreciated that in many workflows, the same or substantially similar operations may be included for segments 316 that require "viewing" rights access as well as for segments 316 that require "editing" rights access). In another example, different operations (in both number and/or type) may be used in workflows for processing one of the segments 316 that requires "request" rights for access, verses another one of the segments 316 that requires "remove" rights for access. Here, an exemplary workflow for the segment 316 requiring "request" rights for access may include the following operations (although more operations, fewer operations, or different operations may be used in other examples): (1) validate order, (2) user approval (e.g., via the user's company administrator, etc.), (3) data approval (e.g., via the data owning company administrator, etc.), (4) payment system approval (e.g., via the payment network administrator), and (5) add access to user. In contrast, an exemplary workflow for the segment 316 requiring "remove" rights for access may include the following operations (although, again, more operations, fewer operations, or different operations may be used in other examples): (1) validate order, (2) user approval (e.g., via the user's company administrator, etc.), and (3) remove access to user. Other examples that may affect the number and/or types of operations in a workflow include, without limitation, the particular transaction data associated with the segments 316, conditions of interactions associated with the segments 316, etc.

Further in the method 300, for each of the scheduled workflows 316, the workflow engine 116 causes the sequence of operations associated with the workflow 316 (e.g., the sequence of operations necessary for the workflow 316 to provide the desired access to the requested segment of the payment network 106, etc.) to be initiated at 318. In particular, a first operation of the sequence of operations of the workflow 316 is initiated, at the processor 202. When completed, the next operation in the sequence of operations is then initiated, and so on until all operations in the sequence are completed. While not required, in the illustrated method, the processor 202 waits for each of the operations to be completed, before initiating a subsequent operation.

With reference to the example order 400 in FIG. 4, along with identifying, from the order 400, the particular segments 408-412 to which the order 400 is directed, the workflow engine 116 also determines, from the access data structure (in data structure 114), appropriate access controls/conditions for the particular segments 408-412 to permit the issuer 104 to access the segments 408-412. In so doing, the workflow engine 116 identifies/generates workflows 414-418 each with an appropriate sequence of operations that, when completed, permit the user access to the corresponding segments 408-412.

Referring again to FIG. 3, in the illustrated method 300, for each of the workflows 316, after each operation of the sequence is initiated, at 318, the workflow engine 116 determines, at 320, if the operation failed or completed. If the operation failed, the workflow engine 116 designates the operation as failed and pauses the workflow, at 322, i.e., the workflow engine 116 does not move on to the next operation in the sequence of operations of the workflow 316. For example, if a workflow includes an operation of acquiring permission to access a segment of the payment network 106 from an administrator associated with the segment, the operation is considered failed if the administrator cannot be reached (e.g., when the web service 118, where the identity of the administrator is stored, cannot be reached because it is undergoing maintenance or because of other reasons; etc.). This failure may be effected if the administrator cannot be reached within a time interval (e.g., one hour, three hours, twenty-four hours, other intervals, etc.) of initiating the operation or of notifying the administrator of the request. With that said, in various embodiments, any lag for administrator interaction in an operation of a workflow is accomplished by alerting the administrator of the requested access then putting the operation in a "Waiting for Approval" state. In other embodiments, the failure may be effected immediately upon initiating the operation, so that the workflow effectively pauses/stops when the operation begins and until an actual response is received from the administrator.

As other examples, operations of a workflow may be considered to have failed if a dependent service (e.g., the web service 118, etc.) fails or cannot be reached, if data inconsistencies appear in the order or during processing of a workflow, if invalid data appears during processing of a workflow (e.g., something possibly not caught during validation of the order, or if back-end data changes after the original order is validated such that conditions of the order or segments identified in the order are now different, etc.), if resources become exhausted in connection with processing the workflow (e.g., if the payment network 106 and/or workflow engine 116 run out of resources to process additional workflow operations due to high load, etc.).

When the workflow is paused at 322 (because of the failed operation at 320), the workflow engine 116 then waits for a predetermined event, at 324. When the workflow engine 116 detects the predetermined event, the workflow engine 116 re-initiates the failed operation, at 326, thereby restarting the workflow at the failed operation. In various embodiments, the predetermined event may include a predefined interval, such as, for example, 2 hours, 24 hours, 100 hours, etc., since the operation failed. In other embodiments, the predetermined event may include a particular time of day, such as, for example, 2:00 AM Eastern Standard Time. In at least one embodiment, the predetermined event may include a human action, such as an input from an employee of the payment network 106. In still other embodiments, the predetermined event may include various combinations thereof.

It should be appreciated that a workflow can also be cancelled, as desired, at any time in the method 300. For example, at any operation, a workflow can be canceled (e.g., by an administrator, by the workflow engine 116, etc.), halting any further processing of that order segment. This also applies to operations that are in repeated failure condition (e.g., that repeatedly fail at 320, etc.). In connection therewith, an administrator can cancel that operation and stop it from further processing.

When the failed operation of the workflow 316 finally completes (i.e., does not fail at 320), the workflow engine 116 determines at 328 if the overall sequence of operations for the workflow 316 is complete. If the overall sequence is not complete, the workflow engine 116 initiates a next operation in the sequence, at 318. The workflow engine 116 then determines, again at 320, if the next operation has failed. If the next operation has failed (or if any subsequent operation in the sequence of operations for the workflow 316 fails at 320), the workflow engine 116 designates the operation as failed and pauses the workflow 316 at 322. The workflow engine 116 then waits for the predetermined event at 324 (which may or may not be the same event as for other failed operations) and re-initiates the failed operation at 326, after the predetermined event. These operations continue for each of the operations in the sequence, until all operations are complete at 328 (indicating completion of the workflow 316).

With that said, it should be appreciated that the operations of checking if an operation failed at 320, pausing the workflow at 322 if the operation failed, waiting for a predetermined event at 324, and re-initiating the failed operation at 326 may be repeated as many times as necessary, for each failed operation in the sequence, for each workflow 316, until the failed operation is completed. In this manner, the workflow 316 is not restarted, and completed operations in the sequence are not initiated again, but rather the workflow 316 is started from the operation on which it was paused. In various embodiments, an administrator of the payment network 106 may be alerted for all failed operations (e.g., immediately, at predefined times (e.g., once a day, etc.), etc.). As such, the administrator can then review all failed operations and determine if intervention is required. However, in at least one embodiment, the workflow engine 116 may include a counter, which is incremented (or decremented) each time the workflow engine 116 re-initiates a failed operation, at 326. When the counter reaches a predetermined value, such as for example, five attempted re-initiations, the workflow engine 116 may halt the workflow 316 and issue an alert to the payment network 106, or an administrator thereof (e.g., requesting manual intervention, etc.).

After the sequence of operations is completed at 328 for the workflow 316, the workflow engine 116 modifies the access database at 330, as necessary, to reflect the status of operations of the workflow 316. For example, in the illustrated method 300, the completed workflow 316 results in an acquired access for the user to a particular segment of the payment network 106 (e.g., a segment associated with transaction data having one or more particular BIN, etc.). As such, at 330, the workflow engine 116 updates the access data structure to indicate that such access has been acquired by the user. In other examples, the completed workflow 316 may result in a denied access for the user, for one or more various reasons (e.g., an administrator may have denied access to the user in one of the operations of the workflow 316, etc.).

Finally, when the workflow engine 116 determines that all of the workflows 316 associated with the order are complete, at 332, the workflow engine 116 notifies the user (who submitted the order) at 334, indicating that the order is complete. The notification may include any suitable notification such as, for example, an indication that access has been granted to the user, or denied, in whole or in part. If access has been granted, the user will be able to access the desired segments of the payment network 106, requested in the order, to accomplish one or more tasks. At this time, the order database is also updated to show that the order is complete. In addition, in some embodiments, when the user submits subsequent orders to the payment network 106 requesting access to one or more of the same segments included in the previous order, the workflow engine 116 may omit workflows for those one or more segments, as access has already been granted.

As can be seen, the systems and methods herein efficiently provision access to segments of payment networks. The systems and methods gracefully handle error conditions that may arise, for example, through failed workflow operations, and expediently address the error conditions by rerunning the failed operations without human intervention, and without repeating or duplicating completed operations. In so doing, the systems and methods effectively self-heal in order to complete provisioning orders.

Again, and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving an order, requesting access to segments of the payment network, from a user; (b) parsing the order into at least a first segment and a second segment of the payment network where each of the first and second segments having at least one access condition; (c) scheduling a first workflow associated with the first segment where the first workflow includes a sequence of operations, and where at least one operation of the sequence of operations is directed to satisfying the at least one access condition for the first segment; (d) when an operation of the sequence of operations for the first workflow fails, re-initiating said failed operation after a predetermined event, but prior to initiating a next operation in the sequence of operations; (e) modifying access to the first segment when the sequence of operations for the first workflow is completed, and the at least one access condition for the first segment is satisfied; (f) scheduling a second workflow associated with the second segment of the payment network where the second workflow includes a sequence of operations and where at least one operation of the sequence of operations is directed to satisfying the at least one access condition for the second segment; and (g) modifying access to the second segment, to provide access to the second segment to the user, when the sequence of operations for the second workflow is completed, and the at least one access condition for the second segment is satisfied.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps or operations may be employed.

As used herein, the term "and/or" includes any and all combinations of one or more of the associated listed items.

Although the terms first, second, third, etc. may be used herein to describe various elements and operations, these elements and operations should not be limited by these terms. These terms may be only used to distinguish one element or operation from another element or operation. Terms such as "first," "second," and other numerical terms when used herein do not imply a sequence or order unless clearly indicated by the context. Thus, a first element operation could be termed a second element or operation without departing from the teachings of the exemplary embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for use in managing access to segments of a payment network, the system comprising:
 a payment network coupled between an acquirer and an issuer and distinct from the acquirer and the issuer, the payment network including a memory having an access data structure and at least one processor coupled to the memory, the at least one processor configured to:
  receive and store, in the memory, an order from the issuer requesting access for a user to a plurality of segments of the payment network;
  validate the order based on at least one of: a format of the order, fields populated in the order, and/or an association of the user identified in the order to the issuer;
  in response to validation of the order, identify the plurality of the segments to which the order is directed;
  schedule, to the at least one processor, at least one workflow for each of the identified plurality of segments, the at least one workflow including a sequence of multiple operations related to at least one access condition for said identified segment and configured to provide the access requested for the user in the order; and
  for each of the scheduled at least one workflow:
   initiate an operation from the sequence of multiple operations in the scheduled at least one workflow;
   (b) determine whether the operation failed or is completed;
   (c) in response to the initiated operation failing:
    designate the operation as failed and halt the scheduled at least one workflow; and
    after a predetermined interval, and prior to initiating a next operation in the sequence of operations, re-initiate the failed operation of the scheduled at least one workflow based on said order, thereby restarting the scheduled at least one workflow at the failed operation, without repeating completed operations of the scheduled at least one workflow; and
   (d) in response to the initiated operation being completed:

determine whether each operation in the sequence of multiple operations of the scheduled at least one workflow is completed;

in response to each operation in the sequence of multiple operations not being completed:

initiate the next operation in the sequence of multiple operations in the scheduled at least one workflow; and return to operation (b); and in response to each operation in the sequence of multiple operations being completed, and the at least one access condition for said identified segment being satisfied, modify the access data structure in the memory to grant the user access to said identified segment.

2. The system of claim 1, wherein the at least one access condition includes an approval from an administrator associated with said identified segment; and wherein at least one operation in the sequence of operations in the scheduled at least one workflow includes transmitting a request for the approval from the administrator.

3. The system of claim 1, wherein the at least one processor is configured to further validate the order based on a level of data included in the plurality of segments of the payment network, wherein the level of data includes either an interbank card association (ICA) level or a bank identification number (BIN) level.

4. The system of claim 1, wherein the at least one processor is configured to schedule the at least one workflow to at least two different processors.

5. The system of claim 1, wherein the at least one processor is further configured to periodically, or continually, store one or more updates related to the order in the memory, whereby the order in the memory is representative of a status of the scheduled at least one workflow and completed operations of the scheduled at least one workflow.

6. The system of claim 1, wherein, for each of the scheduled at least one workflow, the at least one processor is configured to wait to initiate the next operation in the sequence of multiple operations until the previously initiated operation is complete, thereby limiting the at least one processor to only one initiated operation of the sequence of multiple operations at one time.

7. The system of claim 1, wherein the at least one processor is further configured to report, to the user, when all operations in the sequence of multiple operations of the scheduled at least one workflow are finished and the order is complete.

8. The system of claim 1, wherein the at least one processor is configured to receive the order from an issuer of multiple payment accounts; and wherein at least one of the identified plurality of segments of the payment network is associated with transaction data representing transactions to at least some of the multiple payment accounts.

9. The system of claim 1, wherein the plurality of segments include transaction data, and wherein each of the plurality of segments includes transaction data for a single bank identification number (BIN).

* * * * *